United States Patent Office 3,567,706
Patented Mar. 2, 1971

3,567,706
REACTIVE AZO DYES CONTAINING A BENZOTRIAZINE-1-OXIDE
Kurt Brenneisen, Grenzach, Germany, Otmar Thumm, Basel, Switzerland, and Rudolf Wurster, Paterson, N.J., assignors to Sandoz Ltd., also known as Sandoz A.G., Basel, Switzerland
No Drawing. Filed Jan. 3, 1966, Ser. No. 523,497
Claims priority, application Switzerland, Dec. 31, 1964, 16,885/64; Nov. 25, 1965, 16,244/65
(Filed under Rule 47(a) and 35 U.S.C. 116)
Int. Cl. C09d 62/08; D06p 1/02
U.S. Cl. 260—153
6 Claims

ABSTRACT OF THE DISCLOSURE

Intermediates, 3-halo or hydroxy-1,2,4-benzotriazine-1-oxide-6- or -7-carboxylic acid or acid halide, are useful in the preparation of water-soluble reactive dyes having in their molecular structure, as a fiber-reactive group, at least one 3-halo-1,2,4-benzotriazine-1-oxide-6- or -7-carbonamido group.

This invention relates to reactive dyes and the intermediates thereof, the reactive dyes being of the formula

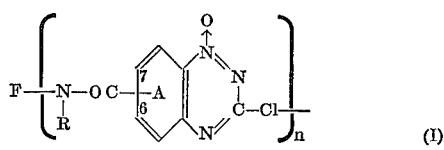

where:
F represents the radical of a water-soluble dye, i.e. the chromophore,
R represents hydrogen or a substituted or unsubstituted hydrocarbon radical,
$n$ represents the figure 1 or 2,
the group

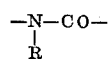

occupies the 6- or 7-position, and where the nucleus A may bear further substituents, such as low molecular alkyl groups or halogen atoms, while the intermediates are of the formula

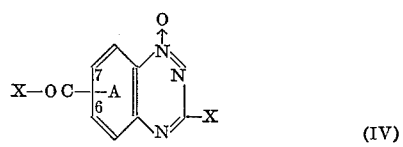

where each X represents a chlorine, bromine or fluorine atom or a hydroxyl group, the group X—OC— occupies the 6- or 7-position, and the nucleus A may bear further substituents, such as low molecular alkyl groups or halogen atoms. In the present specification "low molecular" means "containing from 1 to 5 carbon atoms."

The process for the production of the new reactive dyes of Formula I consists in reacting water-soluble organic dyes or organic compounds capable of dye formation, which contain at least one unsubstituted or monosubstituted amino group, with at least 1 mol of a compound of formula

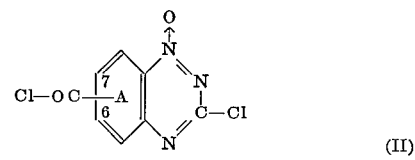

after which the reaction products, when they are capable of dye formation, are converted into water-soluble dyes.

The new process can be practised with all types of water-soluble dyes. When the amino group of the starting dye is monosubstituted the substituent may be an alkyl, hydroxyalkyl, alkoxyalkyl, halogenalkyl or phenylalkyl radical. Thus all organic dyes can be employed which contain at least one amino group bound either to an aromatic nucleus of the dye molecule or indirectly to the dye molecule through an aliphatic chain and possibly a bridge member. Examples of aliphatic chains are

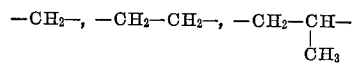

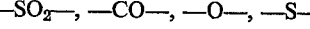

The following are examples of suitable bridge members:

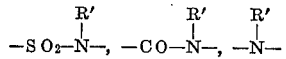

—NH—CO—NH— where R' may represent hydrogen, low molecular alkyl or hydroxyalkyl, cycloalkyl, aryl or aralkyl, or $$-\underset{|}{\overset{R''}{N}}-$$

where R" represents an acyl radical.

Notable examples of this type of dye are aminomonoazo, aminopolyazo, aminostyryl, aminonitro, aminohydroxy-quinophthalone, aminodioxazine, aminoformazane, aminoanthraquinone and aminophthalocyanine dyes. The aminomonoazo, aminopolyazo, aminoformazane and aminophthalocyanine dyes may contain metal atoms in a coordinative bond, for example chromium, cobalt, nickel or copper atoms. Aminoazo dyes containing metallizable groupings can also be reacted with a compound of Formula II; dyes of this type are metallized in substance either before or after condensation, or again they may be reacted in the metal-free form with the fiber by one of the normal methods and the resulting dyeings aftertreated with metal-yielding agents.

As stated in the foregoing definition, it is possible to arrive at dyes containing at least one group of formula

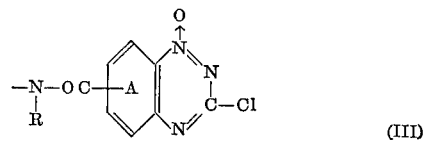

by starting from organic compounds which contain at least one unsubstituted or monosubstituted amino group and are capable of dye formation. Condensation reactions, in particular azo coupling, are important for the reaction giving the final dyes. One suitable procedure is to react a compound containing at least one reactive, unsubstituted or monosubstituted amino group plus one diazotizable amino group of low reactivity with a carboxylic acid chloride of Formula II, to diazotize the intermediate and to couple the diazo compound with a coupling component to give a water-soluble dye. Examples of suitable coupling components are phenolic hydroxy compounds, such as mono- and di-hydroxybenzenes, mono- and di-hydroxynaphthalenes which may be further substituted, for instance with amino, acylamino, alkyl or alkoxy groups or halogen atoms, and in the case of the naphthalene derivatives sulfonic acid groups; enolic hydroxy compounds, such as pyrazolones, acylacetylamino derivatives, preferably 1-aryl-3-methyl- or -carboxy-5-pyrazolones, acetoacetylamino- and benzoylacetylamino-benzenes and -naphthalenes which may bear substituents, such as alkyl and alkoxy groups, halogen atoms or preferably sulfonic acid groups; compounds capable of reacting twice with diazonium salts with formation of formazane dyes, such as cyclohexanone, levulinic acid, malonic acid derivatives, cyanoacetic acid, acetyl- or carboxymethyl-sulfonyl-benzenes or -naphthalenes and their sulfonic acids; amino compounds, such as aminobenzenes coupling in para position to the amino group, preferably substituted or unsubstituted N,N-dialkylaminobenzenes, aminonaphthalenes which couple in ortho position to the amino group and may be monoalkylated or monoarylated and further substituted, for example with hydroxyl groups and/or sulfonic acid groups; 5-aminopyrazoles, etc.

Intermediates suitable for use as coupling components can be formed by reacting with a carboxylic acid halide of Formula II a compound having at least one unsubstituted or monosubstituted amino group and a carbon atom capable of coupling, for example aminohydroxy compounds (aminohydroxy-benzenes and -naphthalenes or their sulfonic acids), amino-enol compounds (amino-aryl-pyrazolones, amino-aceto-acetylamino-benzenes and -naphthalenes and their sulfonic acids), and compounds which are capable of reacting twice with diazonium salts with formation of formazane dyes (aminocyclohexanone, 1-amino-3- or -4-carboxymethylsulfonyl- or -3- or -4-acetyl-methylsulfonyl-benzenes or -naphthalenes). The diazo compound of a diazo component containing a group of Formula III can of course be coupled with a coupling component which likewise contains a group of Formula III.

The following are enumerated as examples of the organic compounds which can be used for the formation of the final water-soluble reactive dyes: 1,3- and 1,4-diaminobenzenes, 1,3- and 1,4-diaminobenzene-sulfonic acids and -carboxylic acids, 4,4'-diamino-1, 1'-diphenyl-3-sulfonic acid, 1-(3- and 4'-amino)-phenyl-3-methyl-5-pyrazolones, aminohydroxynaphthalenes or preferably their sulfonic acids such as 2-amino-5-hydroxynaphthalene-7-sulfonic acid, 2-amino-8-hydroxynaphthalene-6-sulfonic acid, 1-amino-8-hydroxynaphthalene-4,6-disulfonic acid, and 1-amino-8-hydroxynaphthalene-3,6-disulfonic acid.

The monoacylamino-monoamino compounds obtained by mono-condensation of diamines with a carboxylic acid chloride of Formula II can be converted into dyes by a further condensation reaction, for example with an aldehyde with formation of a Schiff's base, or with the acid halide of a dye, preferably a carboxylic acid chloride or sulfonic acid chloride (copper phthalocyanine-polysulfonic acid chloride). Further, ketomethylene compounds, such as pyrazolones and acylacetylamino compounds bearing a group of Formula III can be condensed with an aldehyde, preferably an unsubstituted or substituted N,N-dialkylaminobenzaldehyde, to yield styryl dyes, provided that at least one of the reactants in the condensation contains at least one water-solubilizing group or that such a group is introduced into the dye after condensation. Finally, certain dyes, for example members of the arylaminoanthraquinone and azo series, can be sulfonated subsequently to the introduction of the group of Formula III in order to confer upon them sufficient solubility in water.

Of the aforenamed groups of dyes, special interest attaches to those of the azo, anthraquinone and phthalocyanine series which, besides an amino group, contain about 2 to 4 water-solubilizing groups, preferably sulfonic acid groups. Dyes of this description are disclosed, for example, in British Pat. 904,581, pages 2 to 7, where the substitutent A (dihalogenopyrimidyl) is to be replaced by a hydrogen atom.

The water-soluble dyes or the water-soluble compounds containing an amino group which form the starting products are reacted with a carboxylic acid chloride of Formula II in an aqueous or aqueous-organic medium at 20° to 60° C., preferably at 30–40° C., in the presence of an acid-binding agent such as sodium carbonate, sodium bicarbonate, sodium hydroxide, barium hydroxide, calcium hydroxide or sodium acetate, and at a neutral to weakly acid reaction, preferably in the pH region of 4 to 7 or more particularly 5–6.

The carboxylic acid chloride can be used for acylation in the dry, finely pulverized form or in solution or suspension in benzene, chlorobenzene, methylbenzene, dimethylbenzene, dioxane or acetone. But it is more advantageous to employ the carboxylic acid chloride in the form of an aqueous paste as it is obtained on isolation from the chlorinating mixture. The addition of wetting or emulsifying agents can accelerate the course of the reaction.

When the condensation or coupling reaction has run its course, the final water-soluble reactive dyes are salted out of their solutions or suspensions (which may be previously neutralized if desired) with sodium or potassium chloride, or precipitated with acid, and are then suctioned off, washed and dried.

The thus obtained water-soluble reactive dyes of Formula I, conforming to the invention, are suitable for dyeing leather and for dyeing, padding and printing fibers of animal origin, such as wool, silk and hair, casein fibers, animalized cellulosic fibers, synthetic polyamide fibers, and blends of these fibers. The dyes, which by virtue of the presence of a quaternary amino group are soluble in water, can also be used for dyeing polyacrylonitrile fibers. The dyeings are submitted to a weakly alkaline aftertreatment, preferably at a pH value of 7–8 and at high temperature, with subsequent rinsing. They have good fastness to light, washing at 50° C., water, acid perspiration and rubbing.

The addition of certain quaternizable amines, such as trimethylamine, triethylenediamine or 1,4-bis-(dimethylamino)-butene-2 or -butine-2, of asymmetrical dimethylhydrazine, acetone-N,N-dimethylhydrazone, 2-butanone-N,N-dimethylhydrazone or N-aminopyrrolidine, preferably in stoichiometric amounts, accelerates the rate of fixation of the dye on the fiber so that the fixing temperature can be reduced and/or the fixing time shortened.

The dyes of Formula I reserve secondary cellulose acetate and cellulose triacetate fibers, linear aromatic polyester fibers (polyethylene terephthalate, polyterephthalate of 1,4-di-(hydroxymethyl)-cyclohexane, polyvinyl ester fibers (polyvinyl chloride and acetate) and polyalkylene fibers (polyethylene and polypropylene).

The intermediates of Formula IV in which each X stands for a hydroxyl group are produced by heating a 2-nitro-4- or -5-carboxyphenyl urea in a strong solution of an alkali metal hydroxide, preferably one of at least 20%, for example 20 to 50% strength, and in the temperature range of 50° to 100° C., for example at 60–90° C.

The intermediates of Formula IV in which at least one X stands for a halogen atom are produced by treating 3-hydroxy-1,2,4-benzotriazine-1-oxide-6- or -7-carboxylic acid with a halogenating agent. The best halogenating agents are phosphorus halides, in particular phosphorus oxyhalides, and sulfur oxyhalides, preferably phosphorus oxychloride and thionyl chloride.

Treatment with thionyl chloride is best carried out at temperatures of 60° C. to about 80° C., or preferably at the boiling point; it yields a compound of formula

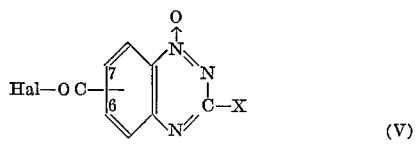

in which Hal stands for a chlorine atom and X for an —OH-group.

Treatment with phosphorus oxychloride is best carried out at temperatures superior to 90° C., preferably at 100–120° C., and where necessary in the presence of tertiary amines, for example diethylaminobenzene or dimethylaminobenzene, which greatly accelerate replacement of the two hydroxyl groups by chlorine. The tertiary amines are best used in amounts of approximately 2 mols per mol of 3-hydroxy-1,2,4-benzotriazine-1-oxide-6- or -7-carboxylic acid, though smaller amounts, e.g. 1 mol, can appreciably accelerate the rate of reaction.

It is of advantage to employ both phosphorus oxychloride and thionyl chloride in substantial excess so that they serve at the same time as reaction medium.

The compounds of Formula V can be isolated, for example, by distilling off the excess thionyl chloride, preferably with reduced pressure. The compounds of Formula IV, in which both X's stand for chlorine, can be isolated, e.g., by running the reaction mixture into ice-water to decompose the phosphorus oxychloride, upon which they are filtered off with suction, if necessary, recrystallized from its solution in an inert solvent and/or purified by sublimation in vacuum.

By partial hydrolysis of 3-chloro-1,2,4-benzotriazine-1-oxide-6- or -7-carboxylic acid chloride the corresponding carboxylic acid of formula

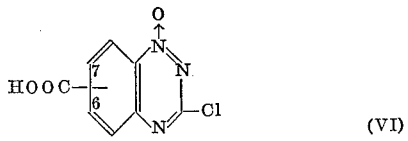

can be obtained. This operation is best conducted in an aqueous-organic medium, for example in a mixture of water and acetone, butanone-2 or dioxane; the concentration of the organic solvent should be sufficiently high to ensure that the 3-chloro-1,2,4-benzotriazine-1-oxide-6- or -7-carboxylic acid chloride goes into solution completely while sufficient water remains for hydrolysis. Suitable mixtures contain, for example, 70 to 90% dioxane and 30 to 10% water or 35 to 90% acetone and 65 to 10% water.

The halogenated compounds thus obtained can be used as herbicides or as intermediates for the production, e.g., of dyes.

In the following examples the parts and percentages are by weight and the temperatures in degrees centigrade.

EXAMPLE 1

56.9 parts of the trisodium salt of 1-hydroxy-2-phenylazo-8-aminonaphthalene-3,6,2'-trisulfonic acid are dissolved in 1000 parts of water at 40°. 70 parts of a moist, freshly prepared paste of 3-chloro-1,2,4-benzotriazine-1-oxide-7-carboxylic acid chloride of about 50% strength are added with vigorous stirring. The condensation reaction is conducted for 2 hours at 40°, during which time the pH value is maintained at 5–6 by dropwise addition of sodium carbonate solution. Subsequently, the reaction medium is clarified by filtration and the condensed dye precipitated with sodium chloride, filtered off, dried and ground. It is then obtained as a brown-red powder which dissolves in water to give bluish red solutions.

DYEING INSTRUCTIONS 1.5 parts of the dye described in the foregoing are dissolved in a dye liquor at 40° consisting of 4000 parts of water, 1 part of stearylpolyglycol ether having 25 ethenoxy groups, 0.3 part of stearolyaminopropyl-di-n-butyl-benzyl-ammonium chloride and 2 parts of 100% acetic acid. In this bath are entered 100 parts of previously wetted wool slubbing. The bath is raised to 100° in 30 minutes and maintained at 98–100° for 1 hour, upon which it is allowed to cool to about 90° and after the addition of 6 parts of 10% ammonia solution is maintained at 90° for a further 20 minutes. The dyed wool is then removed, rinsed and dried. A level bluish red dyeing is obtained which has good fastness to light, washing at 50° and acid perspiration.

Synthetic polyamide fibers can be dyed by the same method whilst for silk a slightly lower temperature, e.g. 90° C., is preferable.

EXAMPLE 2

79 parts of the dye sodium 1-hydroxy-2-phenylazo-8-(3″ - aminobenzoylamino)-naphthalene-3,6,2',4'-tetrasulfonate are dissolved in 2000 parts of water at 40° and 60 parts of a moist paste of 3-chloro-1,2,4-benzotriazine-1-oxide-7-carboxylic acid chloride of about 50% strength are added to the solution with stirring. During the one hour's duration of the condensation reaction the pH value of the reaction mixture is kept at 5–6 by adding sodium carbonate solution. After clarification by filtration the final dye is salted out with sodium chloride, isolated and dried. It is obtained as a dark brown powder which dissolves in water with a red coloration.

EXAMPLE 3

18.8 parts of 1,3-diaminobenzene-4-sulfonic acid are dissolved in 250 parts of water and 13.3 parts of 30% sodium hydroxide solution and to this neutral solution at 30–40° are added 55 parts of a moist paste of 3-chloro-1,2,4-benzotriazine-1-oxide-7-carboxylic acid chloride of about 50% strength. Acylation of the amino group in the 1-position takes place at the pH value of 5–6 which is maintained by addition of a sodium carbonate solution, and is complete after 30 minutes. The reaction mixture is then cooled to 0–5° with ice, 6.9 parts of sodium nitrite are added thereto and it is discharged into a mixture of ice and hydrochloric acid for diazotization. 35 parts of sodium 1-(2',5'-dichlorophenyl)-3-methyl-5-pyrazolone-4'-sulfonate are added to the resulting diazo suspension and coupling is effected by the addition of sodium acetate in portions. The dye thus formed goes into solution. After clarification by filtration it is salted out with sodium chloride, isolated and dried. It is an orange-yellow powder which dissolves in water with a yellow coloration.

The aforenamed coupling component may be replaced by an equivalent amount of sodium 1-(2'-chlorophenyl)-3-methyl-5-pyrazolone-5'-sulfonate, sodium 1-(2'-methylphenyl)-3-methyl-5-pyrazolone-4'-sulfonate or sodium 1-phenyl - 3 - methyl-5-pyrazolone-2'-5'disulfonate, upon which similar dyes are obtained.

The table which follows contains particulars of further dyes conforming to the present invention which bear a radical of formula

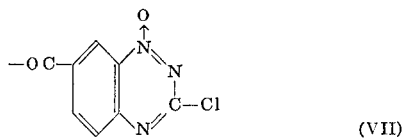

(VII)

bound to one amino group. In the table they are distinguished by the chemical names of the amino dye bearing the radical (VII), the amino group in this being underlined, and by the shade of their dyeings on wool.

TABLE

| Ex. No. | Amino dye (I) | Shade of dyeing on wool |
|---|---|---|
| 4 | 1-hydroxy-2-(4'-ethoxyphenylazo)-6-methylaminonaphthalene-3,2'-disulfonic acid. | Yellowish red. |
| 5 | 1-hydroxy-2-(3'-aminophenylazo)-naphthalene-4,6,6'-trisulfonic acid. | Scarlet. |
| 6 | 1-hydroxy-2-(4'-phenoxyphenylazo)-8-aminonaphthalene-3,5,2'-trisulfonic acid. | Bluish red. |
| 7 | 1-amino-4-(4'-aminophenylamino)-anthraquinone-2,6-disulfonic acid. | Blue. |
| 8 | Copper phthalocyanine-trisulfonic acid-sulfonic acid-(3'-amino-4'-sulfophenyl-amide). | Turquoise. |
| 9 | Copper complex compound of 1-hydroxy-2-(2'-hydroxyphenylazo)-6-aminonaphthalene-3,3',5'-trisulfonic acid. | Red-violet. |
| 10 | 1:2-chromium complex compound of 1-hydroxy-2-(2'-hydroxyphenylazo)-6-aminonaphthalene-3,5'-disulfonic acid. | Navy blue. |
| 11 | 1:2-cobalt complex compound of 1-hydroxy-2-(2'-hydroxy-5'-chlorophenylazo)-6-aminonaphthalene-3,3'-disulfonic acid. | Brownish violet. |
| 12 | 1-(3'-aminophenylazo)-2-hydroxynaphthalene-3,6,6'-trisulfonic acid. | Red-orange. |

EXAMPLE 13

50 parts of 2-nitro-4-carboxyphenyl urea (3-nitro-4-ureido-benzene-1-carboxylic acid) are suspended in 665 parts of 30% sodium chloride solution. The brown-red suspension is heated rapidly to 60° and maintained at 60–65° for 20 minutes, on which the colour changes to yellow-brown. It is then allowed to cool to 30° and is discharged with vigorous stirring into a mixture of 1000 parts of ice and 690 parts of 30% hydrochloric acid. After stirring for 5 minutes, the precipitate is filtered off. The filter cake is washed with water, suspended in 500 parts of water and dissolved by adding sufficient 30% sodium hydroxide solution to obtain the pH value 7.5–8.0. Active charcoal is added and the solution clarified by filtration. The filtrate is acidified, first with acetic acid to the pH value of 5.0 and then with concentrated hydrochloric acid till it shows a weakly acid reaction to Congo red paper, upon which the acid settles out with an ochre colour. The precipitate is filtered off, washed with water and dried at 100°. The yield is 32 parts of 3-hydroxy-1,2,4-benzotriazine-1-oxide-7-carboxylic acid with decomposition point 240–241°. On recrystallization from methanol/water 1:1 rectangular flakes are obtained which melt at 246–248°.

EXAMPLE 14

A suspension of 5 parts of 3-hydroxy-1,2,4-benzotriazine-1-oxide-7-carboxylic acid in 51 parts of phosphorous oxychloride is maintained at the boil for 5 hours, during which substantial development of hydrogen chloride takes place while the starting material goes into solution. On cooling, the 3 - chloro - 1,2,4 - benzotriazine-1-oxide-7-carboxylic acid chloride separates out in crystalline form. The cold suspension is run on to 300 parts of ice and stirred for about 1 hour to decompose the excess phosphorus oxychloride. The yellow, partially crystalline residue is suctioned off, washed with ice water until neutral and freed of water by treatment in a vacuum desiccator above phosphorus pentoxide.

The crude product thus obtained contains approximately 90% of the theoretical chlorine content and its decomposition point is at 160–165°. On sublimation at a pressure of about 0.1 mm. Hg and a bath temperature of 180–200° C., the pure 3-chloro-1,2,4-benzotriazine-1-oxide-7-carboxylic acid chloride is obtained, predominantly in the form of pale yellow needles, with melting point 188–190°.

EXAMPLE 15

30 parts of 3-hydroxy-1,2,4-benzotriazine-1-oxide-7-carboxylic acid are mixed with 255 parts of phosphorus oxychloride and 42 parts of freshly distilled diethylaminobenzene, and the mixture is heated on an oil bath until refluxing takes place. After boiling for about 30 minutes, it is cooled to 30–50° and run on to ice with vigorous stirring, with care taken that the temperature does not rise to above 0°. The reaction product is filtered off and washed with ice water, the paste ground well with a little ice and again filtered off and washed. The residue is pressed down well, then it can be pre-dried in a vacuum desiccator above solid potassium hydroxide and phosphorus pentoxide and subsequently dried in high vacuum at 30° above phosphorus pentoxide or it can be directly employed for the preparation of reactive dyes according to the particulars of Examples 1 to 3.

EXAMPLE 16

2.44 parts of 3-chloro-1,2,4-benzotriazine-1-oxide-7-carboxylic acid chloride are heated in a mixture of 103 parts of acetone and 190 parts of water for 30 minutes with reflux, on which it dissolves completely. The acetone is drawn off in vacuum while the reaction product settles out in the form of yellow six-cornered flakes. After elimination of the acetone the aqueous suspension is held at 0–3° for a further hour, then the residue is filtered off, washed with ice water and dried. 3-chloro-1,2,4-benzotriazine-1-oxide-7-carboxylic acid is obtained in 95% yield; its decomposition point is 206° and it can be recrystalized from methanol or ethanol.

EXAMPLE 17

A solution of 20 parts of 3-hydroxy-1,2,4-benzotriazine-1-oxide-7-carboxylic acid in 500 parts of thionyl chloride is boiled for 17 hours with reflux. The product does not go into solution completely. After all the excess thionyl chloride has been eliminated in vacuum, the 3-hydroxy-1,2,4-benzotriazine-1 - oxide - 7 - carboxylic acid chloride is obtained in quantitative yield, its decomposition point being 210°.

Formulae of representative dyes and intermediates of the foregoing examples are as follows Example 1

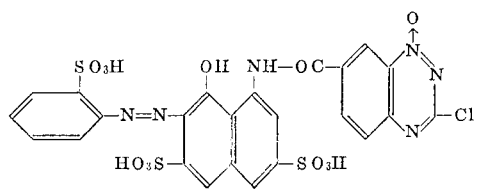

Example 2

[Structure: benzene-SO₃H with -N=N- to naphthalene bearing OH, HO₃S, SO₃H, and NH-OC-phenyl-NH-OC-benzotriazine-N-oxide with Cl]

Example 3

[Structure: benzotriazine N-oxide with Cl, linked via -CO-HN- to phenyl-SO₃H, -N=N- to pyrazolone (HO, CH₃) bearing dichlorophenyl-SO₃H]

Example 13

[Structure: HOOC-benzotriazine N-oxide-OH]

Examples 14/15

[Structure: Cl-OC-benzotriazine N-oxide-Cl]

Example 16

[Structure: HOOC-benzotriazine N-oxide-Cl]

Example 17

[Structure: Cl-OC-benzotriazine N-oxide-OH]

Having thus disclosed the invention what we claim is:

1. Water-soluble reactive dye, in the molecular structure of which the reactive group $$-N(R)-OC-\text{[benzotriazine-N-oxide]}-Cl$$

wherein R is a member selected from the group consisting of hydrogen and lower alkyl, is bound to an aromatic nucleus of a monoazo dye chromophore selected from the group consisting of benzene-azo-naphthalene, metallized benzene-azo-naphthalene and benzene-azo-3-methyl-5-pyrazolone dyes, the 3-methyl-5-pyrazolone bearing in its 1-position a substituent selected from the group consisting of phenyl, methylphenyl, chlorophenyl and dichlorophenyl; and any benzene or naphthalene substituent other than water-solubilizing groups is a member selected from the group consisting of chloro, hydroxy, ethoxy, phenoxy and benzoylamino.

2. Dye according to claim 1 wherein F is benzene-azo-hydroxynaphthalene dye chromophore.

3. Dye according to claim 1 wherein F is metallized benzene-azo-hydroxynaphthalene dye chromophore.

4. Dye according to claim 1 wherein F is benzene-azo-3-methyl-5-pyrazolone dye chromophore.

5. The reactive dye of the formula

[Structure as in Example 2]

6. The reactive dye of the formula

[Structure as in Example 3]

References Cited

Capponi et al., American Dyestuff Reporter, 1961, TP 890A512, pp. 505–514.

CHARLES B. PARKER, Primary Examiner

D. M. PAPUGA, Assistant Examiner

U.S. Cl. X.R.

260—146, 151, 196, 198, 248, 249, 314.5; 8—10, 13, 42, 43, 55